(12) United States Patent
Staines et al.

(10) Patent No.: US 6,969,944 B2
(45) Date of Patent: Nov. 29, 2005

(54) HIGH VOLTAGE GENERATOR, ESPECIALLY FOR USING AS A NOISE FREQUENCY GENERATOR

(75) Inventors: Geoffrey Staines, Röthenbach (DE); Josef Dommer, Nürnberg (DE); Frank Sonnemann, Nürnberg (DE); Jürgen Bohl, Eckental (DE); Tilo Ehlen, Burgschmietstr (DE)

(73) Assignee: Diehl Munitionssysteme GmbH & Co. KG, Röthenbach (DE)

( * ) Notice: Subject to any disclaimer, the term of this patent is extended or adjusted under 35 U.S.C. 154(b) by 56 days.

(21) Appl. No.: 10/450,330

(22) PCT Filed: Oct. 10, 2002

(86) PCT No.: PCT/EP02/11359

§ 371 (c)(1),
(2), (4) Date: Nov. 3, 2003

(87) PCT Pub. No.: WO03/034579

PCT Pub. Date: Apr. 24, 2003

(65) Prior Publication Data

US 2004/0066117 A1    Apr. 8, 2004

(30) Foreign Application Priority Data

Oct. 12, 2001 (DE) .................... 101 50 636

(51) Int. Cl.[7] .............. H01L 41/04; H02N 2/00; H02N 10/00
(52) U.S. Cl. ............... 310/339; 310/306; 310/338
(58) Field of Search ................. 310/339, 306, 310/338

(56) References Cited

U.S. PATENT DOCUMENTS

| 3,596,262 A | * | 7/1971 | Rollwitz et al. ....... 340/870.37 |
| 3,662,194 A | * | 5/1972 | Moriki et al. ................ 310/318 |
| 3,729,639 A | * | 4/1973 | Heinouchi et al. .......... 310/339 |
| 3,859,746 A | * | 1/1975 | Pecksen .......................... 42/84 |
| 3,912,953 A | | 10/1975 | Edoardo ..................... 310/339 |
| 4,315,180 A | * | 2/1982 | Kondo et al. ................ 310/319 |
| 4,623,814 A | * | 11/1986 | Kondo et al. ................ 310/339 |
| 4,811,955 A | * | 3/1989 | De Bernardini ............. 463/51 |
| 5,374,274 A | * | 12/1994 | Sproviero et al. .......... 606/131 |
| 5,527,405 A | * | 6/1996 | Schleicher et al. ........... 149/35 |
| 5,635,685 A | * | 6/1997 | Tierce et al. ................ 181/106 |
| 5,932,011 A | * | 8/1999 | Noakes et al. .............. 118/629 |
| 2004/0020946 A1 | * | 2/2004 | Fleischhauer et al. ...... 222/389 |

FOREIGN PATENT DOCUMENTS

| DE | 3522994 A1 | 1/1987 | ............ H01L 41/08 |
| DE | 19959358 A1 | 6/2001 | ............ F41B 15/00 |
| WO | WO 98/36395 | 8/1998 | .......... G08C 17/02 |

* cited by examiner

*Primary Examiner*—Darren Schuberg
*Assistant Examiner*—J. Aguirrechea
(74) *Attorney, Agent, or Firm*—Scully, Scott, Murphy & Presser

(57) ABSTRACT

A very compact interference frequency generator (11) which emits with an extremely wide band width and extremely powerfully is afforded by the combination of a mechanical pulse generator (25) with two piezoelectric pillars (13) which are disposed axially in succession and which can be axially acted upon by the pulse generator (25) and which are electrically connected in series in opposite relationship and which are electrically conductively connected with their mutually remote ends (18) to electrodes (34) which extend parallel to the piezoelectric pillars (13) to an electrically conductive coupling portion (15) between the piezoelectric pillars (13) where they end as electrodes (36) of an axial spark gap and at the same time spark gaps (37) which are oriented inclinedly radially towards the coupling portion (15).

7 Claims, 1 Drawing Sheet

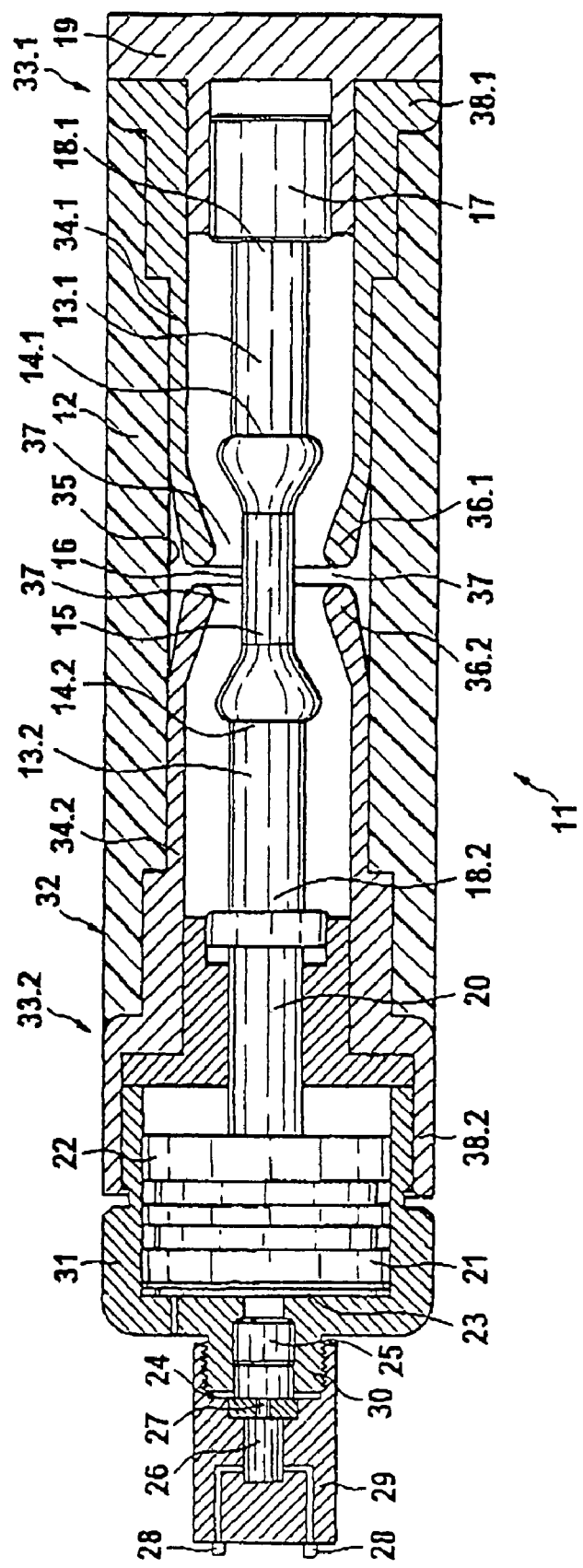

HIGH VOLTAGE GENERATOR, ESPECIALLY FOR USING AS A NOISE FREQUENCY GENERATOR

BACKGROUND OF THE INVENTION

1. Field of the Invention

The invention concerns a generator which is adapted for use as an interference frequency generator, including piezoelectric pillars for the conversion of mechanical pressure into electrical voltage which can be short-circuited by way of spark gaps.

2. Discussion of the Prior Art

A high-voltage generator of that kind is known in particular in the form of the so-called Marx surge voltage circuit in which firstly a number of capacitors connected in parallel are charged up and then switched in series across spark gaps in order thereby to apply a correspondingly multiplied voltage to a test path across which a flash-over possibly occurs. The high discharge current flow from the array of capacitors, which is linked to a voltage flash-over, gives rise to high-frequency emissions which as is known in turn in their environment at least adversely affect radio communications and in particular at the input side can interfere with or even destroy electronic circuits.

That effect of a powerful spark discharge is propagated as a non-lethal weapon, more specifically as a system for sustainedly interfering with or even destroying hostile communication procedures (see DER SPIEGEL, Issue July 1997, pages 53 ff, end of the third paragraph of the left-hand column on page 54).

A high-voltage interference generator of the general kind set forth is known from DE 199 59 358 A1 in the form of an RF-radiation source which is constructed on a modular basis as a series circuit, with an autonomously operating high-energy generator, wherein primary energy discontinuously feeds an antenna system by way of a voltage-boosting module and a discharge cable, in order to emit a high level of pulse output power in frequency ranges above 100 MHz. A piezoelectric generator which is acted upon by explosive can be provided for the primary energy supply and the voltage-boosting module connected on the output side of the piezoelectric generator can be embodied in the form of the Marx surge voltage circuit for the function discussed in the opening part of this specification. Pulse generation is implemented by the provision of a cable pulser in accordance with Vedenski, which depending on the respective circuitry configuration involved generates monopolar or bipolar square-wave voltage pulses, the pulse length of which is adjustable by way of the length of the high-voltage cable on the way to the emitting wide-band antenna. It will be noted that the pulse shape, due to the system involved, does not have a very steep flank and therefore is not optimum in regard to a wide-band action which is desired. Added to that is the fact that such a module chain circuit is very space-consuming and can therefore scarcely be handled, being at most suitable for stationary operation.

The situation does not involve such a non-lethal weapon effect if coded high-frequency signals are to be produced for object identification at a location at which no electrical energy is available for the generator circuit and therefore, in accordance with WO 98/36395, a primary energy transducer employing for example the piezoelectric effect is used. The electrical energy acts on a spark gap or the like non-linear element for producing a narrow-band high-frequency signal which for example can be coded by means of the reflection pattern of a surface wave filter and can then be emitted as identity information. If energy production were to give rise to considerable interference radiation, then the coding circuit which is to be powered from the piezoelectric system would of course suffer from interference in respect of its function or would even be blocked.

Even the production of a lighting flame in the case of a piezoelectric lighter in accordance with GB 1 554 332 A with its two piezoelectric pillars which are arranged in series mechanically in opposite directions but which are electrically connected in parallel and which are acted upon by a mechanical pulse by a resiliently biased hammer in order by way of a throttle to feed an externally disposed spark gap as a gas lighter have nothing to do with the problems of a high-energy interference pulse generator of a compact structure. That applies in corresponding manner to the starter spark plug, which operates on the same principle, for an internal combustion engine, with cylindrical piezoelectric elements which are disposed mechanically in series in opposite relationship but which are electrically connected in parallel, in accordance with JP 05256241 A (Abstract) for feeding a spark gap in front of an end of that arrangement, in that respect as in the case of the conventional electrical Otto-cycle engine spark plug. In the ignition device in accordance with DE 24 12 300 C3, which is controlled by a camshaft, the charge displacement produced by the piezoelectric effect is taken off at a spacing coupling member between two axially successively disposed cylindrical piezoelectric elements and passed by way of a shielded cable to the location of ignition of a fuel mixture or the like. It will be apparent that it is also not possible to derive therefrom anything in regard to optimising the function of a non-lethal weapon which is based on wide-band and high-energy, high-frequency interference radiation.

SUMMARY OF THE INVENTION

The object of the invention is to provide a weapon of that kind, which can be used autonomously in terms of its energy supply and universally in respect of its dimensions, and which is particularly effective in respect of its interference radiation spectrum and its emitted energy.

That object is attained by the essential features of the invention which are recited in the main claim.

In accordance therewith two longitudinally polarised piezoelectric generator pillars are clamped in position in linearly mutually aligned relationship but connected electrically in series in opposite relationship, in a tubular housing with a radial spacing relative to the internal peripheral surface of the housing. Within the housing those pillars can be axially acted upon by at least one shock generator which is flange-mounted to the housing at the end. In each piezoelectric pillar that results in an axial charge displacement, that is to say it results in a voltage being built up across the two ends thereof. However, because a substantially equal electrical potential always prevails as a result of the anti-series connection at the mutually remote ends of the pillars and thus at both ends of the housing, there is practically no danger of a voltage flash-over between the ends over the length of the housing so that the insulation properties of the housing are not critical.

Extending in the interior of the housing in radially spaced relationship with respect to the piezoelectric pillars are preferably hollow-cylindrical electrodes, the electrodes extending from the respective end of the housing where they are electrically conductively connected to the end of the pillar there, into the region in which the two pillars are axially supported relative to each other by way of an electrically conductive coupling portion. Each piezoelectric pillar which is charged up as a result of the longitudinal pressure effect is discharged by way of its electrode and a radial spark gap to the common coupling portion at the opposite end of the pillar. Because those discharges however do not start at exactly the same time due to environmental considerations and the environment of the axially mutually facing end edges of the electrodes is already ionised by the first discharge which occurs in the radial direction, flash-overs also occur parallel to the coupling portion in axially oriented spark gaps between the end edges of the electrodes, that is to say parallel to the central longitudinal axis of the housing. Such spark flash-overs which take place in mutually overlapping relationship in respect of time and in respect of space in the centre of the housing give rise to current flows, which occur with a correspondingly steep edge, through the electrodes, and they therefore result in a microwave interference spectrum which is desirable as it is of very high power and of extremely wide band width. This has an even higher harmonics content if a stationary insulating fluid filling of the housing is omitted and instead the discharge is already abruptly interrupted again after a short time for example by blowing air under pressure into the flash-over space.

Preferably a pyrotechnic gas generator based on the propellent powders which are readily available in the technology of barrel munitions or airbag propellent compositions and which in turn can be pyrotechnically or electrically initiated serves as the shock generator for subjecting the piezoelectric pillars which bear against each other to the effect of longitudinal pressure. In comparison with an explosive-operated shock generator which in principle can also be employed in the context of the present invention, the gas generator has in particular the advantages that it is possible to easily and reproducibly influence the rising edge of the pressure, by way of the grain size and the mixture of the propellent powder. In addition, a pyrotechnic gas generator with its propellent powder can be handled with much fewer problems in mass production than an explosive-operated shock generator.

This powerful system produced in accordance with the invention involving the integration of shock, high-voltage and microwave generator can be of such a compact design configuration, by virtue of the negligibly low external flash-over danger, that it can be brought into position by means of carrier munitions and can even be disposed in an executive case and can therefore be inconspicuously positioned in order for example to provide for wide-band paralysis of hostile—for example conspiratorial or terrorist—wireless and wire-based communication, directly before one's own security forces go in. In that respect a point which is of particular practical attraction is that resonance phenomena in the wide-band interference spectrum, due to the dimensions involved, mean that narrow-band effective gaps, that is to say limited frequency ranges occur, which suffer markedly less interference. Therefore the radio communications of one's own forces can be maintained in those narrow bands while in other respects wide-band interference is effectively implemented.

BRIEF DESCRIPTION OF THE DRAWING

In order to describe in greater detail the invention and the possible options afforded thereby and in respect of further advantages and modifications of the described arrangement, attention is directed to the further claims and to the description hereinafter of a preferred embodiment of the invention which is diagrammatically shown in greatly abstracted form but approximately true to scale as an axial longitudinal section, being limited to the essential features involved.

DETAILED DESCRIPTION OF THE INVENTION

The generator 11 shown in the single FIGURE of the drawing serves for shock-induced production of high voltage which is discharged as very wide-band interference frequency radiation. The generator 11 includes, coaxially and radially spaced in a hollow-cylindrical housing 12 which is extended in a tubular shape, two high-voltage pillars 13 (13.1 and 13.2) which are stacked in a manner which is known as such, from respective axially polarised piezoelectric discs. The pillars 13 are supported against each other with their head ends 14, with the interposition of an inert (that is to say not piezo-sensitive) electrically conductive coupling portion 15. In its longitudinal configuration, it has a central constriction 16 in respect of its cross-section, approximately as illustrated in the manner of two truncated cones which face towards each other with their smaller base surfaces but which are axially spaced from each other. In opposite relationship the one piezoelectric pillar 13.1 is supported with its foot end 18.1 against an inertia mass 17 in front of an end portion 19 in the form of a cover. Disposed in axially opposite relationship against the foot end 18.2 of the other piezoelectric pillar 13.2 is a pressure-transmitting ram 20 which can be subjected to pressure in the longitudinal direction by a piston 21 of substantially larger diameter, the piston 21 being disposed coaxially behind the ram 20. The piston 21 is guided with sealing rings 22 in a cylinder 23 into which opens, on the other side of the ram 20, a receiving space 24 for a small can-shaped gas generator 25 of a diameter which is very small relative to the piston 21. In axially opposite relationship, opening into the receiving space 24 is a firing passage 27 which starts from a pyrotechnic firing element 26.

The firing element 26 which can be initiated for example by way of mechanical piercing or as indicated electrically by way of connections 38, with its firing passage 27, is disposed in a closure member 29 which can be releasably secured to the receiving space 24 for the gas generator 25, for example as shown diagrammatically it can be screwed coaxially on to the wall of the receiving space 24. The receiving space 24 is in turn disposed in a central connecting portion 30 in front of a hood 31 which contains the cylinder 23 and which, like the oppositely disposed end portion 19, is connected to the hollow-cylindrical wall 32 in such a way that it can be axially loaded, for example being screwed thereto directly or by means of clamping shafts which extend parallel to the axis of the arrangement.

In order to avoid parasitic flash-overs at field-concentrating structural edges, the piezoelectric pillars 13 are of smaller diameter at their head and foot ends 14, 18 than the surfaces, which here bear in flush butting relationship thereagainst, of the inertia mass 17, the coupling portion 15 and the ram 20, the radially projecting portions of which, as shown in the drawing, are rounded off with the largest possible radii, to adapt them to the electrical field configuration.

A respective electrode 34 is coaxially fitted into the hollow-cylindrical housing 12 in electrically insulated relationship therewith at a radial distance relative to the pillars 13.1, 13.2, in the two ends 33 of the housing, that is to say in the end 33.1 provided with the inertia mass 17 and in the end 33.2 which is provided in opposite relationship with the ram 20. Preferably the housing 12 consists entirely of electrically insulating material such as fibre-reinforced plastic material so that, as diagrammatically illustrated, no additional insulation for the electrodes 34 is required. Each of the two electrodes 34 bears snugly over the major part of its axial length against the internal wall 35 of the housing. The area around the end edge of the respective electrode, in the central region of the coupling portion, then however lifts away from the internal wall 35 in order to extend inclinedly radially towards the coupling portion 15. That freely protruding end edge is thickened and serves as a spark electrode 36 for the radial flash-over region as a spark path 37 towards the coupling portion 15 and for an additional axial flash-over region (spark gap 37) towards the axially opposite electrode end edge. As diagrammatically shown the respective electrode 34 can be in the form of a thin-walled hollow cylinder whose diameter decreases towards the end edge in the manner of a truncated cone. Instead of a closed wall however the electrode 34 can also be mounted on the internal wall 35 of the housing, in the form of a conductive lattice or in the form of a group of bars which are parallel to the axis and which extend in a radially bent configuration towards the end edge.

A respective mounting end 37.1 and 37.2 of the electrodes 34.1 and 34.2 respectively, which end is in axially opposite relationship to the end edge and which is enlarged in a stepped configuration outwardly to form a peripherally extending collar, is disposed axially in front of the corresponding end 33.1, 33.2 of the tubular housing 12. Here, the electrodes 34.2, 34.2 are electrically conductively connected to the foot ends 18.1, 18.2 of the associated ones of the piezoelectric pillars 13.1, 13.2, on the one hand by way of the end portion 19 and the inertia mass 17 and on the other hand by way of the hood 31, the piston 21 and the ram 20. In that connecting region, the electrodes 34 are also accessible for the adaptation of additional wire-shaped or sleeve-shaped antenna elements in order to render the flow of current and therewith the microwave emission upon firing of the spark gaps 37, even more intensive.

In order to bring that high-voltage and interference-frequency generator 11 with pyrotechnic pulse generator 25 interchangeably flange-mounted thereto into operation, the can-shaped housing of the gas generator 25 is introduced coaxially into the receiving space 24 in opposite relationship to the cylinder 23 and then the closure member 29 with the firing element 26 is fitted on, by means of a screw or bayonet fastening. The firing element 26 reacts for example to electrical initiation and then in turn, through the firing passage 27, activates the powder filling in the gas generator 25. Considered in qualitative terms, as is known for example from airbag initiation (see PCT/EP93/02550), a large volume of combustion reaction gases is produced, which issue through a thin passage into the cylinder 23 which in comparison is of very large diameter, and abruptly accelerate the piston 21 which is of correspondingly large area and which, by way of the ram 22, applies a longitudinal pressure pulse to the two piezoelectric pillars 13.2, 13.1 which are disposed coaxially one in front of the other, by way of the central coupling portion 15 thereof, in relation to the counterpart inertia mass 17.

Because the two piezoelectric pillars 13.2, 13.1 are disposed electrically in series in opposite relationship, so that identical polarities and practically equal voltages respectively prevail at the head ends 14.2 and 14.1 on the one hand and at the foot ends 18.2 and 18.1 on the other hand, no discharge phenomena occur either between the electrically conductive ends of the housing 12 or even only initially between the spark electrodes 36. On the contrary the potential difference of the respective piezoelectric pillar voltages is radially between the spark gap electrodes 36.2/36.1 on the one hand and the coupling portion 15 on the other hand, so that here the situation involves the introductory spark flash-over, that is to say discharge of the piezoelectric voltage, by way initially of one of the two radially oriented spark gaps 37 which are disposed in axially closely adjacent relationship with each other in the housing 12 before immediately thereafter the other spark gap 37 also fires in that pre-ionised environment. That current flow, which correspondingly steeply rises but which is not synchronised in respect of time, through the electrodes 34.2, 34.1 and by way of the two mutually adjacent spark gaps 37 which are oriented radially with respect to the longitudinal axis of the system, results in the build-up of mutually superimposed, strongly oscillating electromagnetic fields and thus intensive microwave emission which is of very wide-band nature by way of the short switching processes across the short spark gaps 37. The spectrum of the microwave emission is still further broadened by virtue of the fact that the two discharge processes which take place differently due to random factors across the radial spark gaps 37 immediately result in a potential difference between the two spark gap electrodes 36 and then because of the already ionised environment they also immediately result in superimposed spark flash-over along axial spark gaps 37 directly between the free end edges of the two electrodes 36.

A desirable time extension of the emission interval is afforded by virtue of the fact that the mechanical build-up of pressure in the piezoelectric pillars 13, by virtue of the combustion characteristics in the gas generator 25 and the conversion of an increasing volume of gas into pressure in the cylinder 23, takes place in the millisecond range and thus extremely slowly in comparison with the spark gap switching processes. The consequence of this is that, with a progressive build-up of pressure, the arrangement provides for repeated fresh firing across the spark gaps 37 and thus affords microwave emission which occurs for a longer period of time. As already mentioned the spark gap current flow and thus the high-frequency emission effect is further enhanced if, at the ends 33 of the housing 12, electrically conductive wires or sleeves are connected as additional antenna elements to the electrodes 34, which accordingly do not have to be disposed in the circuit by way of the respective piezoelectric pillar 13.

The spectrum of the interference emission can be still further widened if, after the steep onset of the discharge processes across the spark gaps 27, they are equally suddenly brought to an end. That can be implemented in a relatively simple manner if inert gas or simply compressed air is blown through the annular space between the electrodes 34 and the piezoelectric pillars 13. Radial line connections can be introduced into the housing 12 for that purpose, in front of the ends 33, although such connections are not shown in the drawing.

In order to again activate the two piezoelectric generators 13 immediately after termination of the discharge, the hood 31 with the closure member 29 can be provided in the manner of a revolver with a displaceable or rotating arrangement of a plurality of mutually displaced gas generators 25 together with firing elements 26 which are simply advanced to the next unconsumed element. Such additional prolongation in respect of time of the microwave emission advantageously increases the interference effect thereof.

In brief terms therefore the invention affords a very compact powerful interference frequency generator 11 by virtue of the combination of a mechanical pulse generator 25 with two piezoelectric pillars 13 which can be mechanically acted upon thereby and which are electrically connected in series in opposite relationship and which are preferably disposed axially in succession and which, with their ends 18 that are then remote from each other, are connected electrically conductively to electrodes 34 which extend parallel to the piezoelectric pillars 13 as far as an electrically conductive coupling portion 15 in the centre of the housing between the piezoelectric pillars 13 where they end inclinedly towards the coupling portion 15 as spark gap electrodes 36. The discharge which initially starts only with the voltage of one of the two piezoelectric pillars 13 across a radial spark gap 37 and which immediately thereafter rises with double the voltage across an axial spark gap 37 between the electrodes 36.1–36.2 results in such powerful, strongly oscillating currents through the electrodes 34 that—even without external additional antennas at the ends of the housing—an extremely wide-band microwave spectrum is extremely powerfully emitted. As therefore the compact electrode structure itself acts as an integrated antenna this overall system which is of a compact structure as it is resistant to flash-over represents a microwave radiating device which is self-sufficient in use, with an integrated high-voltage generator, which can be disposed and operated inconspicuously in a container of the format for example of a briefcase.

What is claimed is:

1. A high-voltage interference frequency generator (11) comprising a hollow cylindrical housing (12) containing piezoelectric pillars (13) for the conversion of mechanical pressure into electrical voltage which is short-circuited by spark gaps (37), characterized in that a mechanical pulse generator (25) is connected in series with said housing (12), two said piezoelectric pillars (13) each comprising a plurality of axially polarized piezoelectric discs being electrically connected in series in opposite relationship by an electrically conductive coupling portion (15), electrodes (34) extending from opposite ends (18) of the pillars (13) along the lengths of said pillars into the region of the coupling portion (15) said electrodes (34) terminating at proximate ends thereof into spark electrodes (36) for forming said spark gaps (37) extending towards the coupling portion (15) and between each other, said mechanical pulse generator (25) imparting an axial force against said piezoelectric pillars (13) to generate a voltage resulting in a build-up of mutually superimposed, oscillating electromagnetic fields and intensive microwave emission of wide-bond nature through the short-circuiting across the spark gaps (37).

2. A generator according to claim 1 wherein the mechanical pulse generator is a gas generator (25) producing reaction gases which act by a piston (21) to exert said axial force on the piezoelectric pillars (13.2, 13.1).

3. A generator according to claim 2, wherein said mechanical pulse generator (25) is located at an end (33) of the housing (12) for axially displaceably receiving said piston (21) including a cylinder (23), into which opens a receiving space (24) for said gas generator which is fitted so as to be interchangeable with a closure member (29) containing a pyrotechnic firing element (26).

4. A generator according to claim 2, wherein pulse generator (25) is operative of a housing end (33.2) by the piston (21) and a ram (20) on the piezoelectric pillars (13) which at axially opposite end (33.1) of the housing are supported in relation to the housing (12) through an inertia counterpart mass (17) and an end portion (19) of the housing.

5. A generator according to claim 1, wherein a centrally constricted coupling portion (15) is provided as a spark gap electrode between the axially alignedly piezoelectric pillars (13.2–13.1) which are electrically connected in series in a mutually opposite relationship.

6. A generator according to claim 1, wherein said electrode (34) is provided in the region of each of the ends (18) of said two axially arranged piezoelectric pillars (13) which are electrically connected together in series in opposite relationship, said electrode (34) which is guided along the internal wall (35) of the housing and electrically connected to said piezoelectric pillars (13), the two electrodes terminating in the region of an electrically conductive coupling portion (15) between the two piezoelectric pillars (13) in mutually facing relationship to form spark gap electrodes (36).

7. A generator according to claim 6, wherein each said electrode (34) is in the form of a thin hollow cylinder which tapers in a hollow frustoconical configuration towards the spark gap electrodes (36) and which in an axially opposite relationship is enlarged to form a peripherally extending collar against which there axially bears an end (33) of the tubular housing (22).

\* \* \* \* \*